United States Patent [19]
Cho et al.

[11] Patent Number: 6,021,506
[45] Date of Patent: Feb. 1, 2000

[54] METHOD AND APPARATUS FOR STOPPING A BUS CLOCK WHILE THERE ARE NO ACTIVITIES ON A BUS

[75] Inventors: Sung Soo Cho, Sunnyvale; Nima Homayoun, San Jose, both of Calif.

[73] Assignee: Intel Corporation, Santa Clara, Calif.

[21] Appl. No.: 09/127,575

[22] Filed: Jul. 31, 1998

[51] Int. Cl.[7] .................................................. G06F 1/10
[52] U.S. Cl. ............................................................ 713/601
[58] Field of Search .................................. 713/320, 322, 713/323, 324, 601

[56] References Cited

U.S. PATENT DOCUMENTS

| | | | |
|---|---|---|---|
| 5,392,437 | 2/1995 | Matter et al. ........................ | 713/601 X |
| 5,638,083 | 6/1997 | Margeson ............................ | 713/322 X |
| 5,799,198 | 8/1998 | Fung ...................................... | 713/323 |

*Primary Examiner*—Thomas M. Heckler
*Attorney, Agent, or Firm*—Blakely, Sokoloff, Taylor & Zafman LLP

[57] ABSTRACT

A method and apparatus for stopping a bus clock when there are no activities present on a bus. In the illustrated embodiment, an AGP bus couples a graphics controller to core logic to transfer data between the two devices. A controller generates a first (AGP bus) clock signal CLK and a second (internal) clock signal iclk for the first and second devices. If the controller determines that there are no graphics activities on the AGP bus (i.e., the bus is idle), the controller issues a stop request to stop the internal clock signal iclk. The processing of the stop request is delayed for a period of seven cycles on the AGP bus clock CLK to await for an objection from either the graphics controller or the core logic. If an objection is received during the seven cycle delay, the internal clock iclk will not be stopped, and will continue to run. However, if an objection is not received, then the internal clock iclk will stop. If the graphics controller is in a low power or "sleep" state, the AGP bus clock CLK is stopped, thereby conserving power.

26 Claims, 4 Drawing Sheets

METHOD AND APPARATUS FOR STOPPING A BUS CLOCK WHILE THERE ARE NO ACTIVITIES ON A BUS

BACKGROUND OF THE INVENTION

1. Field of the Invention

The present invention relates generally to computer systems architecture, and, more particularly, to a method and apparatus for stopping a bus clock for a point-to-point bus while no activity is present on such bus.

2. Description of the Related Art

Traditionally, the generation of graphics on computer systems have been accomplished via graphics devices coupled by a peripheral component interface (PCI) bus. Turning to the drawings, and specifically referring to FIG. 1, a conventional system 100 for generating such graphics on a computer display via a PCI 105 bus is shown. The system 100 includes a central processing unit (CPU) 110 for running a particular computer program thereon, with the computer program providing instructions to a graphics controller 120 to display such graphics on a display device (not shown). The PCI bus 105 is also coupled to a core logic 130, which is coupled to a main memory 140. The core logic 130 is a chipset that controls access to the main memory 140 by the graphics controller 120 for generating the graphics. The PCI bus 105 typically also couples other devices to the CPU 110, such as, for example, a disk drive 150.

The graphics controller 120 uses the main memory 140 to perform various graphics-related tasks, such as, for example, three-dimensional geometric calculations, accessing texture maps stored within the memory 140 for rendering 3D graphics, etc. The PCI bus 105 typically runs at 33 MHz, which permits a maximum transfer rate of 133 Mbyte/s between the graphics controller 120 and the main memory 140 to perform these various graphics-related tasks.

The PCI bus 105 is generally an adequate medium for interaction between the graphics controller 120 and core logic 130 to process basic two and three-dimensional graphics. However, with the significant increase in the sophistication of these graphics over the past few years, namely the emergence of complex three-dimensional graphics, the use of the PCI bus 105 for graphics applications has become problematical. As the graphics have become more complex, the graphics controller 120 requires greater, and quicker access, to the main memory 140 to process these complex tasks. The limited bandwidth of the PCI bus 105 limits the capability of the graphics controller 120 to efficiently generate these complex 3D graphics. Moreover, the graphics controller 120 shares the PCI bus 105 with other "non-graphics" related devices, such as the disk drive 150, thereby further reducing the amount of bandwidth the PCI bus 105 provides to the graphics controller 120. As a result, the PCI bus 105 has become more and more sluggish to adequately handle the latest in 3D graphics technology.

To alleviate the problems associated with the limited bandwidth available to the graphics controller 120 by the PCI bus 105, another technology, referred to as the "Accelerated Graphics Port" or "AGP", had been developed. In accordance with the AGP architecture, the graphics controller 120 is linked directly to the core logic 130 via an AGP bus 115, which runs at twice the speed of the PCI bus 105. As a result of its increased speed, the AGP bus 115 provides a minimum transfer rate that significantly dwarfs the transfer rate of the PCI bus 105. Moreover, the AGP bus 115 is a dedicated "point-to-point" bus, which provides direct access to the core logic 130 from the graphics controller 120. This provides a significant advantage over the PCI bus 105, in which the graphics controller 120 has to share the PCI bus 105 with other "non-graphics" devices.

With its increased transfer rate and direct "point-to-point" connection, the AGP bus 115 sufficiently handles the complex three-dimensional graphics of today's computer applications. However, as a result of the significant increase in speed that the AGP bus 115 provides over the PCI bus 105, the AGP bus 115 consumes significantly more power than the PCI bus 105. This drawback of the AGP bus 115 is particularly disadvantageous to portable or mobile computer users since it typically can drain the battery of a portable or laptop computer at a much quicker rate than the conventional PCI bus 105 for generating graphics.

The present invention is directed to overcoming, or at least reducing the effects of, one or more of the problems set forth above.

SUMMARY OF THE INVENTION

In one aspect of the present invention, a method is provided for controlling a clock for a bus. The bus couples at least a first device and a second device. The bus and first and second devices assume one of a plurality of power states. The method includes generating a first clock signal for the bus and a second clock signal for the first and second devices and determining whether traffic is present on the bus. The method further includes stopping the second clock signal in response to determining that traffic was absent from the bus, and stopping the first clock signal if the first and second devices are in a first power state.

In another aspect of the present invention, an apparatus includes a first device and a second device. A bus coupled to the first device and second device transfers data between the first and second devices. The apparatus further includes a controller to generate a first clock signal for the bus and a second clock signal for the first and second devices. The controller stops the first clock signal after determining there is no activity on the bus.

BRIEF DESCRIPTION OF THE DRAWINGS

Other objects and advantages of the invention will become apparent upon reading the following detailed description and upon reference to the drawings in which.

Figure 1:
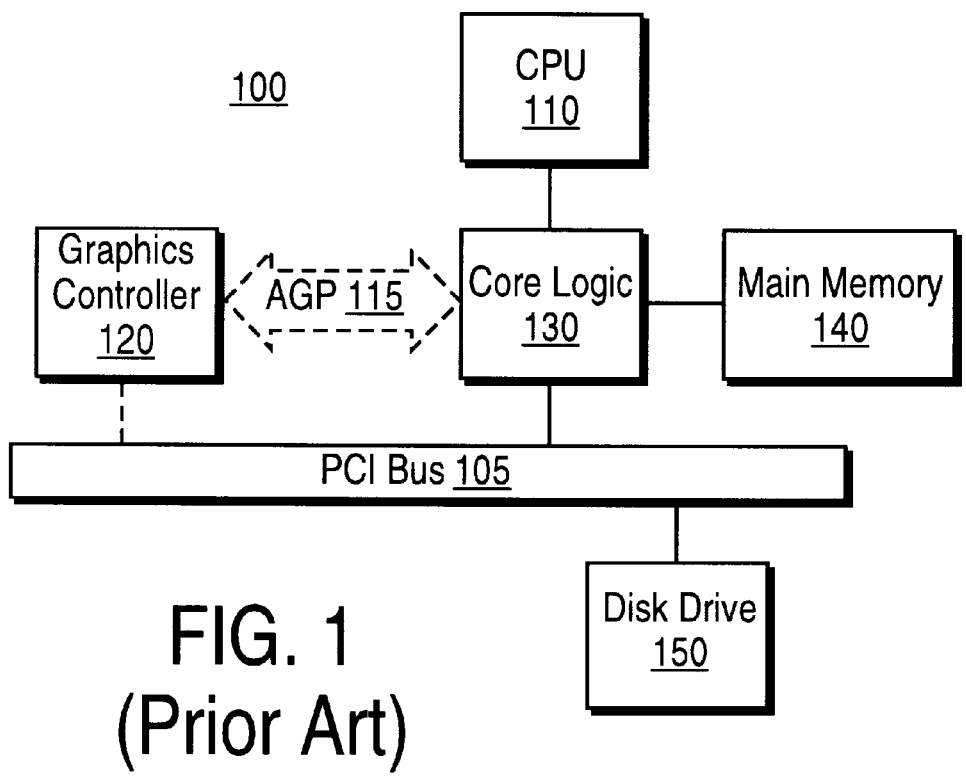
FIG. 1 shows a block diagram of a prior art graphics system, which illustrates the difference between the use of a PCI bus and an AGP bus for performing graphics functions.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nonetheless be a routine undertaking for those of ordinary skill in the art having the benefit of this disclosure.

Figure 2:
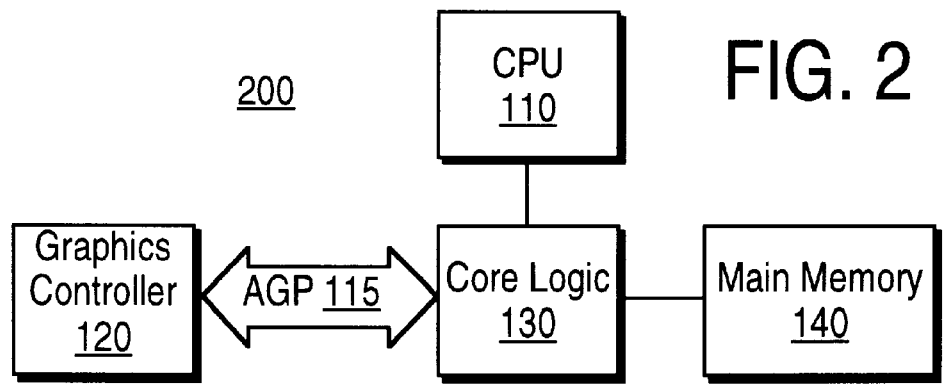
FIG. 2 depicts a block diagram of a graphics system in accordance with one embodiment of the present invention.

Turning now to the drawings, and specifically referring to FIG. 2, an apparatus 200, incorporating an Accelerated Graphics Port (AGP) architecture, is shown in accordance with the present invention. In one embodiment, the apparatus 200 could take the form of a personal computer (PC). The apparatus 200 comprises a CPU 110 for running various types of computer programs thereon. The computer programs running on the CPU 110 could be two or three-dimensional graphics-based applications, such as computer games or design-related software, and, could also be text-based applications, such as word processing, spreadsheet, and e-mail applications. The computer programs running on the CPU 110 could include any commercially available software that is compatible with the CPU 110, and, thus, need not be limited to the aforementioned examples.

The apparatus 200 further includes a graphics controller 120 for generating graphics on a display device (not shown) under the direction of the computer program running on the CPU 110. The graphics controller 120 is coupled to core logic 130 (commonly known as the "North Bridge") via a dedicated "point-to-point" bus 115, such as an AGP bus in accordance with the illustrated embodiment. As previously mentioned, the core logic 130 is a chipset that controls access to a main memory 140 by the graphics controller 120 and the CPU 110. The core logic 130 generates a first clock signal, which in the illustrated embodiment is an AGP bus clock signal CLK, for transferring data between the graphics controller 120 and the core logic 130 over the AGP bus 115. As mentioned, the AGP bus 115 is a dedicated point-to-point bus, and is only accessed by either the graphics controller 120 or the core logic 130.

Each device of the apparatus 200 (i.e., the graphics controller 120, core logic 130, main memory 140, etc.) is dynamically placed in one of four "device" power states (i.e., D0, D1, D2, and D 3) by the operating system (OS) running on the CPU 110. The D0 power state supplies full power to a device, which yields the highest level of power consumption of the device. When in the D0 power state, the device is completely active and responsive, and typically remembers all relevant context continuously. In the D3 power state, no power is supplied to the device and typically all relevant context is completely lost. Once in the D3 power state, the device can only return to the D0 state, where the device is again fully powered and reset. The D1 and D2 power states occur when a device is set in a "sleep" state. In the D1 state, the device will consume more power and preserve more relevant context than that of the D2 power state. Essentially, the D2 power state places the device in a "deeper" sleep state than that of the D1 power state. Each device of the apparatus 200 is placed in one of these states D0–D3 dependent upon its current involvement in a particular task that is accomplished by the apparatus 200. That is, if there are no graphics activities currently being performed, the graphics controller 120 may be disposed in a D1 or D2 "sleep" state by the operating system (OS). The manner in which the OS determines to place a device in one of these particular states D0–D3 is well known to those of ordinary skill in the art. Accordingly, the specifics of such process will not be discussed herein to avoid unnecessarily obscuring the invention.

In addition to the assignment of power states to the devices of the apparatus 200, the OS may place the AGP bus 115 in one of three "bus" power states (i.e., B0, B1, and B2). In the B0 power state, the AGP bus 115 is completely powered and fully operational. In the B2 state, the AGP bus 115 is partially powered in a "sleep" state. And, in the B3 state, the AGP bus 115 has no power applied thereto and is inoperative. Once in the B3 state, the AGP bus 115 can be reset by the OS to the B0 state, and become fully operational to enable interaction between the graphics controller 120 and the core logic 130.

When the apparatus 200 is engaged in graphics activities, the AGP bus 115 is in the B0 power state and the AGP bus clock CLK remains operational to perform such graphics activities. The graphics activities may include the rendering of 3D graphics wherein the graphics controller 120 accesses the main memory 140, via the AGP bus 115 and core logic 130, to apply texture to a 3D geometry. Of course, the graphics controller 120 could perform several other graphics-related tasks, and, thus, need not be limited to the aforementioned example. When these graphics activities cease, the constant running of the AGP bus clock CLK is undesirable because the AGP bus 115 is not being used in this current state. Thus, in accordance with the present invention, the AGP bus clock CLK is stopped, thereby conserving the power consumed by the apparatus 200. One manner in which the AGP bus clock CLK is stopped when there are no graphics activities over the AGP bus 115 is set forth below.

Figure 3:
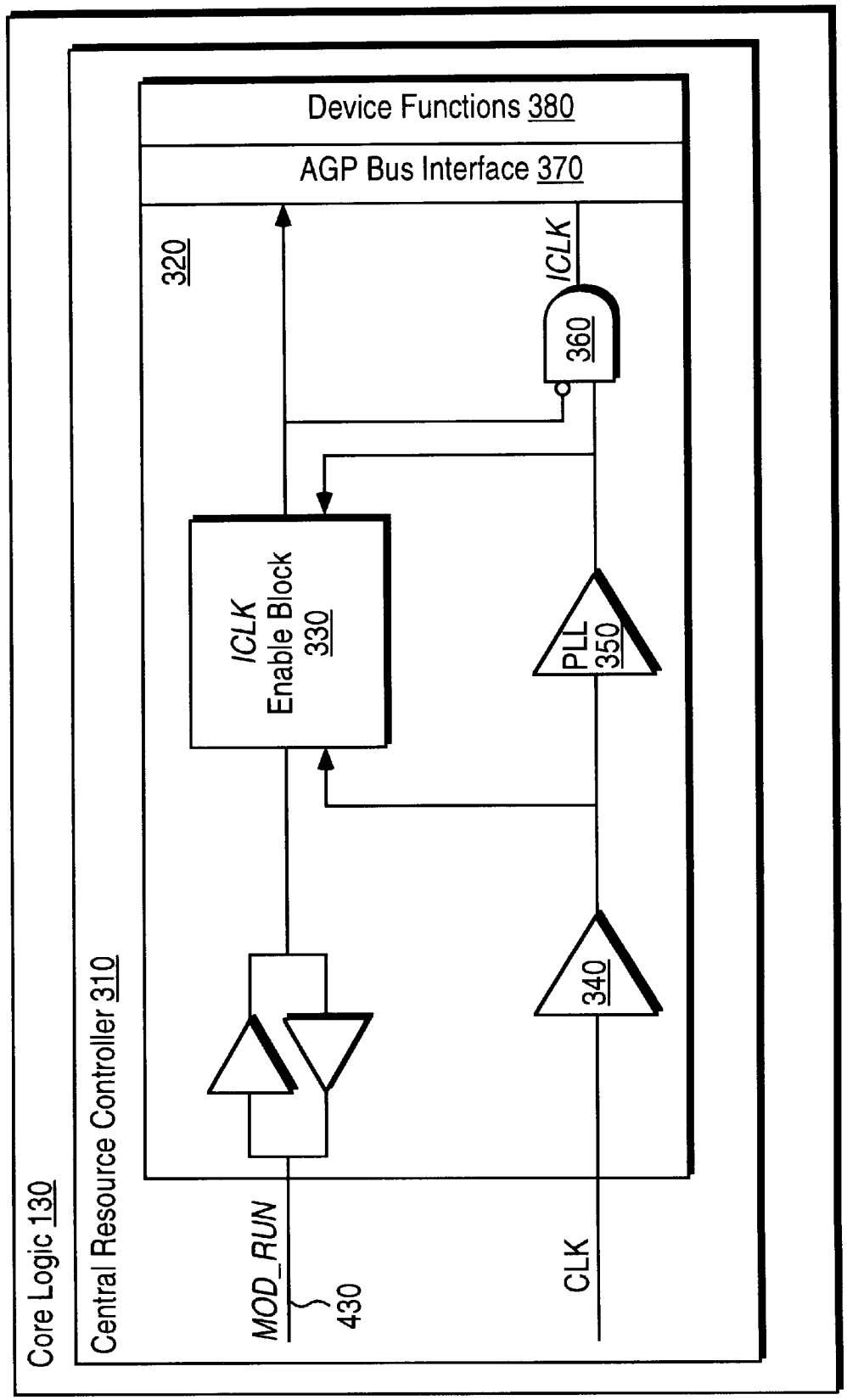
FIG. 3 shows a core logic device of FIG. 2 in detail, which includes a module to stop an AGP bus clock CLK.

Turning now to FIG. 3, the core logic 130 (of FIG. 2) includes a central resource controller 310, which generates and controls the AGP bus clock CLK to permit traffic across the AGP bus 115 between the graphics controller 120 and the core logic 130. The central resource controller 310 further controls a second clock signal (i.e., an internal clock "iclk"), which is used by the graphics controller 120 and the core logic 130 to perform their respective functions.

The central resource controller 310 includes a "MOD_RUN" module 320, which controls the starting and stopping of the internal clock iclk, which in turn will ultimately result in the starting and stopping of the AGP bus CLK, depending upon whether graphics activities are being conducted on the AGP bus 115.

Figure 4:
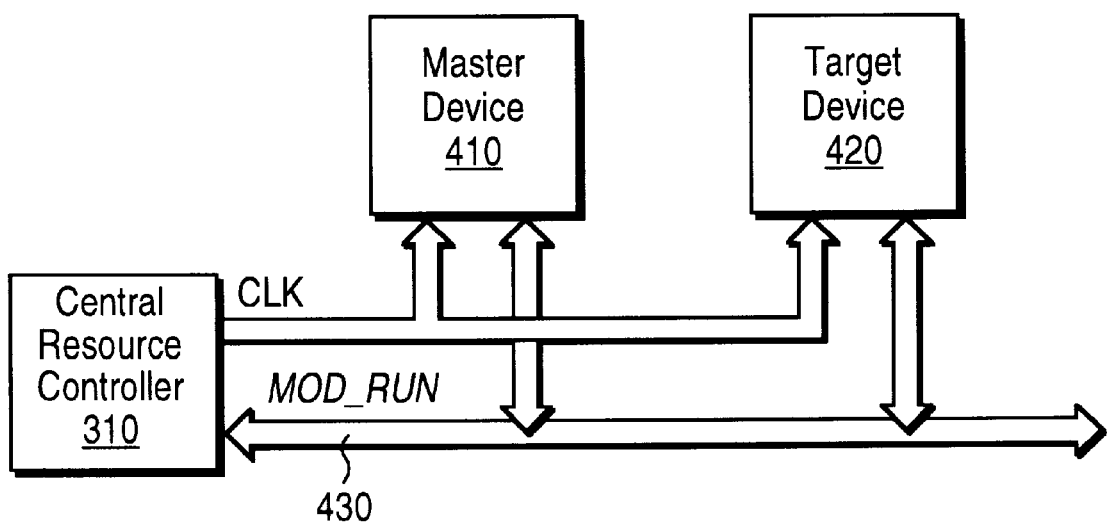
FIG. 4 illustrates a relationship between the roles assumed by a central resource controller (of the core logic device in FIG. 2), a master device, and a target device for controlling clock signals.

Turning to FIG. 4, a relationship between the role of the central resource controller 310, a master device 410, and a target device 420 is shown. The master device 410 and the target device 420 are coupled to the AGP bus 115. Thus, in accordance with the illustrated embodiment, the master device 410 or the target device 420 could be either the graphics controller 120 or the core logic 130. If the graphics controller 120 desires to use the AGP bus 115 to communicate with the core logic 130, then the graphics controller 120 assumes the role of the master device 410 and the core logic 130 assumes the role of the target device 420. Consequently, if the core logic 130 desires to initiate communication over the AGP bus 115 with the graphics controller 120, then the core logic 130 assumes the role of the master device 410 and the graphics controller 120 assumes the role of the target device 420.

The central resource controller 310 provides the AGP bus clock signal CLK to both the master device 410 and the target device 420 on the AGP bus 115. The central resource controller 310 also drives a MOD_RUN line 430 to control the MOD_RUN module 320. For the central resource controller 310, the MOD_RUN line 430 is a sustained tri-state I/O signal. For the master and target devices 410, 420, the MOD_RUN line 430 is an open drain output as well as an input. That is, the master and target devices 410, 420 have the capability to monitor the state of the MOD_RUN line 430 and, in addition to such monitoring, to drive the MOD_RUN line 430 LOW. The central resource controller 310 has the capability to monitor the state of the MOD_RUN line 430 and to drive it either HIGH or LOW.

Now, turning back to FIG. 3, the MOD_RUN line 430 indicates the state of the internal clock iclk, which is controlled by the MOD_RUN module 320 of the central resource controller 310. The MOD_RUN module 320 includes an input for the MOD_RUN line 430 and for the AGP bus clock CLK as shown in FIG. 3. The module 320 also includes an iclk enable block 330 for producing an active or inactive icik enable signal (i.e., iclken). The module 320 further includes an inverter 340 for buffering the AGP bus clock signal CLK. Subsequent to buffering, the AGP bus clock signal CLK is fed into the iclk enable block 330 as well as being passed through a phase locked loop (PLL) 350. The PLL output CLK signal is then fed back into the iclk enable block 330. The output CLK signal is also passed to an input of a gate 360. The gate 360 starts and stops the internal clock iclk dependent upon the output of the iclk enable block 330).

When the MOD_RUN line 430 is HIGH, which can only be set by the central resource controller 310, it causes the iclk enable block 330 to send an inactive iclk enable signal (i.e., inactive iclken) to the gate 360, which causes the internal clock iclk to stop. When the MOD_RUN line 430 is LOW, it causes the iclk enable block 330 to send an active iclk enable signal (i.e., active iclken) to the gate 360, which causes the internal clock iclk to run. The internal clock iclk is sent to an AGP bus interface 370 and then to the graphics controller 120 and the core logic 130, to perform their respective device functions 380.

If either the graphics controller 120 or the core logic 130 desires to take control of the AGP bus 115 to transfer data to another device, the graphics controller 120 or the core logic 130 (i.e., whichever one desires to become the master device 410) will request an active iclken signal to start the internal clock iclk. In order to do so, the graphics controller 120 or core logic 130 will assert the MOD_RUN line 430 to drive the line 430 LOW. This will cause the iclk enable block 330 to generate an active iclken signal and cause the gate 360 to start the internal clock iclk.

If the central resource controller 310 determines that there are no graphics activities on the AGP bus 115, it will assert the MOD_RUN line 430 HIGH in order to stop the internal clock iclk However, before the internal clock iclk is stopped due to a lack of graphics activities, a seven clock cycle delay (from the AGP bus clock CLK signal) is imposed before the internal clock iclk is actually stopped. The seven cycle delay provides the graphics controller 120 or the core logic 130 an opportunity to object to the central resource controller's desire to stop the internal clock iclk. The graphics controller 120 or the core logic 130 could object by asserting the MOD_RUN line 430, in which case the MOD_RUN line 430 would go LOW and the internal clock iclk would continue to run.

If an objection to stopping the internal clock iclk by either the graphics controller 120 or the core logic 130 had not been made, the internal clock iclk is stopped after the seven cycle delay period. The central resource controller 310 will then determine the power states of the graphics controller 120 and the core logic 130. If the power states of these devices are D2 or D3, the central resource controller 310 will request that the AGP bus clock CLK be stopped. It is important to note, however, that the central resource controller 310 cannot request the AGP bus clock CLK be stopped until the internal clock iclk has been stopped. Once stopped, the AGP bus clock CLK can be started again if a D0 power state is again assumed or the MOD_RUN line 430 is asserted by either the graphics controller 120 or the core logic 130 for at least seven clock signals.

Figure 5:
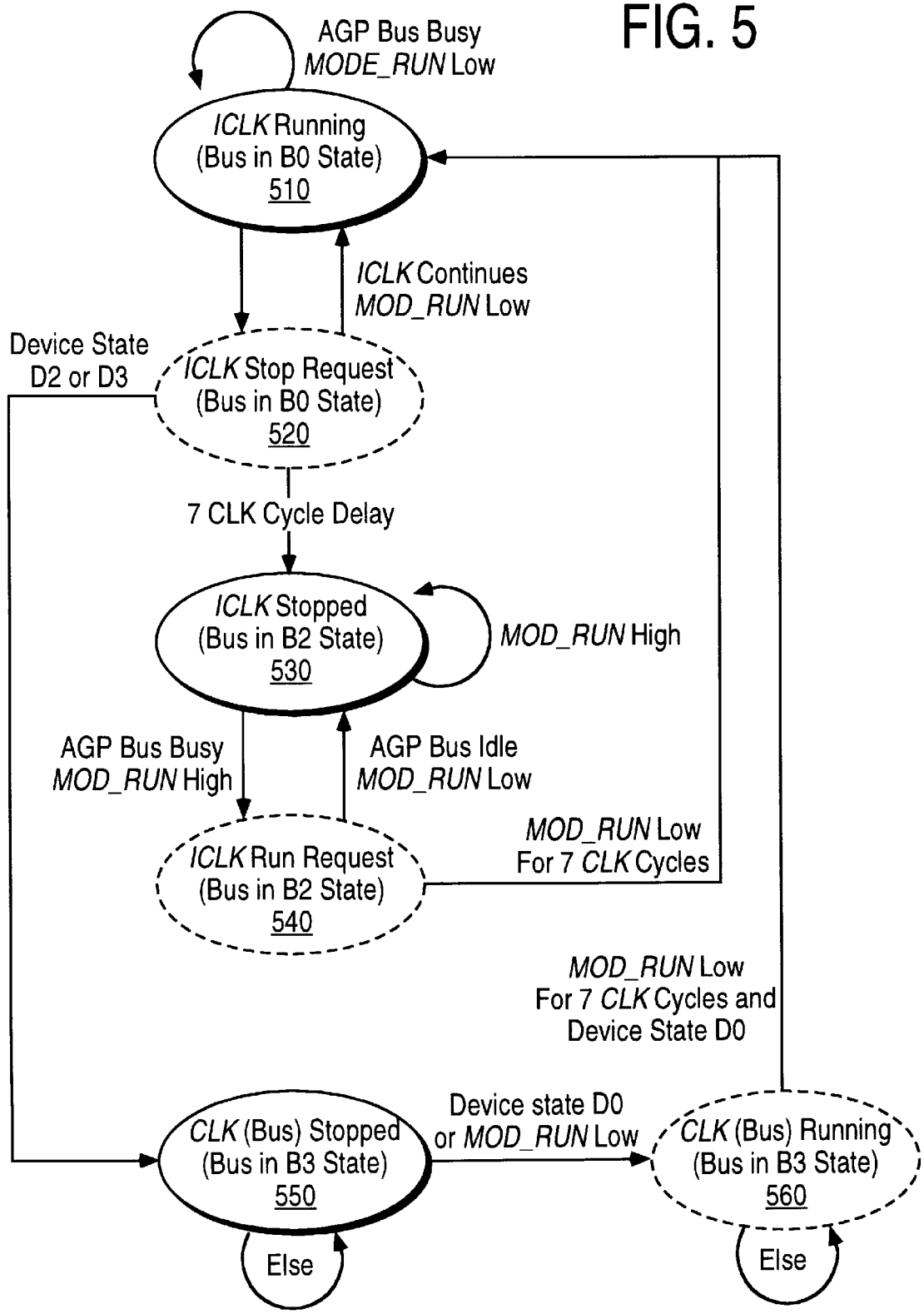
FIG. 5 depicts a state diagram giving the various power states of the AGP bus of FIG. 3.

Turning now to FIG. 5, a state diagram depicting the various states assumed by the AGP bus 115 is shown. In a first state 510, when there is graphics activity on the AGP bus 115 (i.e., the AGP bus 115 assumes a B0 state), the MOD_RUN line 430 is set LOW and the internal clock iclk is running. If it is determined that the AGP bus 115 is idle, the central resource controller 310 will drive the MOD_RUN line 430 HIGH, which will cause an iclk stop request to be generated at the intermediate state 520. During this intermediate state 520, the AGP bus 115 still remains in the B0 state for seven clock cycles on the AGP bus clock CLK. This seven clock cycle delay permits either the graphics controller 120 or the core logic 130 to request for the internal clock iclk to remain running (i.e., by driving the MOD_RUN line 430 LOW), if so desired. If there is no objection to stopping the internal clock iclk during the seven clock cycle delay period, then the internal clock iclk is stopped at state 530. In state 530, the AGP bus 115 changes to the B2 state (i.e., the "sleep" state), and will remain in this state so long as the MOD_RUN line 430 remains HIGH.

If in state 530 the graphics controller 120 or the core logic 130 desires to access the AGP bus 115 (i.e., start the internal clock iclk), either device will assert the MOD_RUN line 430 LOW, which will cause a transition to another intermediate state 540 to commence an internal clock iclk run request. In this intermediate state 540, the AGP bus 115 still remains in the B2 state for a seven cycle delay period on the AGP bus clock CLK If there are no objections to the internal clock iclk run request, then the first state 510 is assumed, where the AGP bus 115 is placed in the B0 state. However, if there is an objection to the iclk run request (i.e., if the central resource controller 320 drives the MOD_RUN line 430 HIGH), then the AGP bus 115 is returned back to state 530, where the internal clock iclk remains stopped and the AGP bus 115 remains in the B2 state.

While in state 530, it is determined if the graphics controller 120 is in its D2 or D3 power state (i.e., little or no graphics activity performed by the graphics controller 120). If the graphics controller 120 is in the D2 or D3 power state, a state 550 will be assumed wherein the AGP bus 115 goes into its B3 state (i.e., having no power supplied thereto) and the AGP bus clock CLK is stopped. Entry to state 550 will save the apparatus 200 power because it stops the AGP bus clock CLK when there is no graphics activity on the AGP bus 115. After shutting down the AGP bus clock CLK, if the graphics controller 120 is reset to a D0 state (i.e., powered up) or the MOD_RUN line 430 is driven LOW, an intermediate state 560 will be assumed. During the intermediate state 560, the AGP bus 115 still remains in the B3 state until the MOD_RUN line 430 remains LOW (or the graphics controller 120 remains in the D0 state) for at least seven clock cycles. If this condition is satisfied, the AGP bus clock CLK will start again to commence graphics activities over the AGP bus 115. Accordingly, the first state 510 will again be assumed, where the internal clock iclk starts and the AGP bus 115 is set to the B0 (i.e., fully operational) state.

While the present invention has been described primarily in connection with an AGP bus, it will be appreciated that the apparatus and methodology described herein to stop the AGP bus clock could be used for any type of "point-to point" bus, and, thus need not be limited specifically to an AGP bus.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for controlling a clock for a bus, said bus coupling at least a first device and second device, and said bus, first and second devices assuming one of a plurality of power states, said method comprising:

generating a first clock signal for said bus and a second clock signal for said first and second devices;

determining whether traffic is present on said bus;

stopping said second clock signal in response to determining that traffic was absent from said bus; and stopping said first clock signal if said first and second devices are in a first power state.

2. The method of claim 1, wherein said stopping said second clock further comprises:

placing a request to stop said second clock signal in response to determining that traffic was absent from said bus; and stopping said second clock signal in response to said stop request.

3. The method of claim 1, wherein said plurality of power states includes a sleep state and wherein said stopping said first clock signal for said bus further comprises:

stopping said first clock signal for said bus if said first and second devices are in the sleep state.

4. The method of claim 1, further comprising:

generating a request from at least one of said first device and said second device to start said second clock signal; and starting said second clock signal in response to said request.

5. The method of claim 4, wherein said starting said second clock signal, further comprises:

starting said second clock signal in response to generating said request within a predetermined time period.

6. The method of claim 1, further comprising:

starting said first clock signal for said bus in response to at least one of said first device and said second device assuming a second power state.

7. The method of claim 6, wherein said starting said first clock signal for said bus further comprises:

starting said first clock signal for said bus in response to said first or second device assuming a full power state.

8. The method of claim 1, wherein said controlling a clock for a bus further comprises:

controlling a clock for an Advanced Graphics Port (AGP) bus.

9. The method of claim 8, wherein said generating a first clock signal for said bus further comprises:

generating an AGP bus clock signal for said AGP bus and a second clock signal for said first and second devices.

10. The method of claim 1, wherein said stopping said second clock further comprises:

stopping said second clock after expiration of a predetermined time period.

11. The method of claim 10, wherein said stopping said second clock after expiration of a predetermined time period further comprises:

placing a stop request to stop said second clock signal in response to determining that traffic was absent from said bus;

determining if an object signal was received by at least one of said first device and said second device to object to stop said second clock; and stopping said second clock signal if said object signal has not been received within said predetermined time period.

12. The method of claim 10, wherein said stopping said second clock after expiration of a predetermined time period further comprises:

placing a stop request to stop said second clock signal in response to determining that traffic was absent from said bus;

determining if an object signal was received by at least one of said first device and said second device to object to stop said second clock; and permitting said second clock signal to run if said object signal has been received within said predetermined time period.

13. An apparatus, comprising:

a first device;

a second device;

a bus coupled to said first device and said second device to transfer data between said first and second devices; and a controller to generate a first clock signal for said bus and a second clock signal for said first and second devices and to stop said first clock signal after determining there is no activity on said bus.

14. The apparatus of claim 13, wherein said bus comprises an Advanced Graphics Port (AGP) bus.

15. The apparatus of claim 14, wherein said first clock signal comprises an AGP bus clock signal.

16. An apparatus, comprising:

a bus capable of assuming a plurality of bus power states;

a first device coupled to said bus and capable of assuming a plurality of device power states;

a second device coupled to said bus and capable of assuming said plurality of device power states; and a controller capable of generating a first clock signal for said bus and a second clock signal for said first and second devices, to determine if traffic is present on said bus, to stop said second clock signal in response to determining that traffic was absent from said bus, and to stop said first clock signal if said first and second devices are in a first device power state.

17. The apparatus of claim 16, wherein said controller is further adapted to receive a request from at least one of said first device and said second device to start said second clock signal, and to start said second clock signal in response to receiving said request.

18. The apparatus of claim 16, wherein said first power state comprises one of an "off" or "sleep" power state.

19. The apparatus of claim 16, wherein said controller is further adapted to start said first clock signal for said bus in response to at least one of said first device and said second device assuming a second device power state.

20. The apparatus of claim 19, wherein said second power state comprises a fill power state.

21. The apparatus of claim 16, wherein said bus comprises an Advanced Graphics Port (AGP) bus.

22. The apparatus of claim 21, wherein said first clock signal comprises an AGP bus clock signal.

23. The apparatus of claim 16, wherein said controller is further capable of placing a stop request to stop said second clock signal in response to determining that traffic was absent from said bus, and to stop said second clock signal in response to said stop request.

24. The apparatus of claim 23, wherein said stopping said second clock occurs after expiration of a predetermined time period.

25. The apparatus of claim 24, wherein said controller is further capable of determining if an object signal was received by said first or second device to object to stop said second clock, and to stop said second clock signal if said object signal has not been received within said predetermined time period.

26. The apparatus of claim 24, wherein said controller is further capable of determining if an object signal was received by said first or second device to object to stop said second clock, and to not stop said second clock signal if said object signal has been received within said predetermined time period.

* * * * *